United States Patent [19]

Wong et al.

[11] Patent Number: 5,439,657
[45] Date of Patent: Aug. 8, 1995

[54] MOLYBDENUM CATALYST SEPARATION

[75] Inventors: Tim T. Wong, Downingtown;
Lawrence M. Candela, Philadelphia,
both of Pa.

[73] Assignee: Arco Chemical Technology, L.P.,
Greenville, Del.

[21] Appl. No.: 242,921

[22] Filed: May 16, 1994

[51] Int. Cl.⁶ .................... B01D 11/00; C01G 39/00
[52] U.S. Cl. ........................................ 423/54
[58] Field of Search ............................. 423/54

[56] References Cited

U.S. PATENT DOCUMENTS

| | | | |
|---|---|---|---|
| 3,351,635 | 11/1967 | Kollar | 549/529 |
| 3,763,303 | 10/1973 | Khuri et al. | 423/54 |
| 4,328,191 | 5/1982 | Su et al. | 423/54 |
| 4,405,572 | 9/1983 | Moore et al. | 423/54 |
| 4,721,606 | 1/1988 | Tilley | 423/54 |
| 5,171,868 | 12/1992 | Albal et al. | 549/529 |
| 5,210,354 | 5/1993 | Dubner et al. | 585/469 |
| 5,276,235 | 1/1994 | Dubner | 585/469 |

*Primary Examiner*—Steven Bos
*Attorney, Agent, or Firm*—William C. Long

[57] ABSTRACT

The present invention relates to the separation of molybdenum from epoxidation process streams by extraction with water insoluble tertiary amine.

6 Claims, 1 Drawing Sheet

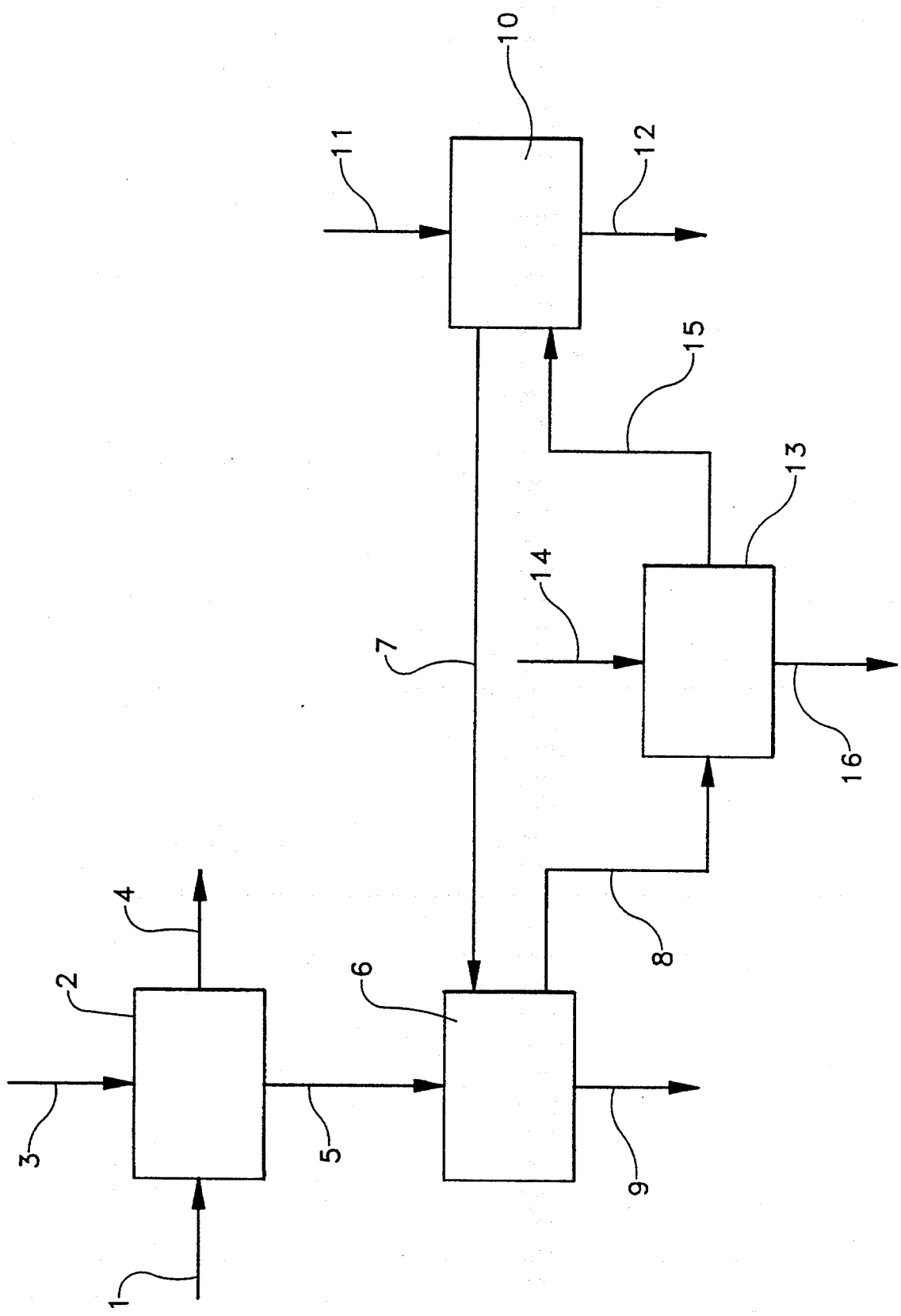

MOLYBDENUM CATALYST SEPARATION

BACKGROUND OF THE INVENTION

1. Field of the Invention

The present invention relates to the separation and recovery of molybdenum epoxidation catalyst residues from epoxidation process streams through the use of a water insoluble tertiary amine.

2. Background of the Invention

Successful commercial processes for the production of oxirane compounds such as propylene oxide have been developed which provide for the reaction of an olefin such as propylene with an organic hydroperoxide such as ethylbenzene hydroperoxide or tertiary butyl hydroperoxide in the presence of a soluble molybdenum catalyst. The basic patent covering this reaction is U.S. Pat. No. 3,351,635.

The separation of the molybdenum catalyst as well as various organic impurities such as phenol and carboxylic acids from the epoxidation reaction mixture can be accomplished by aqueous caustic treatment. However, difficulties remain in the work-up and recovery or disposal of aqueous caustic treatment streams, especially in view of the increasingly stringent environmental regulations being applied.

SUMMARY OF THE INVENTION

The present invention provides a method for the separation and recovery of molybdenum catalyst from such aqueous caustic treatment stream wherein the caustic treatment stream is acidified such as with sulfuric acid, hydrochloric acid, or the like, phase separated to separate organic material from an aqueous phase comprised of the molybdenum catalyst values, and the molybdenum catalyst values are removed from the aqueous phase by contact with a water insoluble tertiary amine preferably in an organic solvent such as ethyl benzene.

BRIEF DESCRIPTION OF THE DRAWING

The accompanying drawing illustrates in schematic form practice of the invention.

DETAILED DESCRIPTION

In accordance with the invention, an epoxidation reaction mixture resulting from the molybdenum catalyzed reaction of an olefin with an organic hydroperoxide is treated with aqueous sodium hydroxide in order to remove various impurities such as phenol and carboxylic acids as well as the molybdenum catalyst. The treated reaction mixture is separated from the aqueous caustic phase and is further processed in accordance with known procedures.

The separated aqueous caustic stream is then acidified by the addition of a strong mineral acid such as sulfuric acid as described, for example, in U.S. Pat. No. 5,171,868. The acidification mixture is conveniently phase separated and a separate organic layer can be recovered and used, for example, as fuel. The aqueous phase is treated for the separation of the contained molybdenum components in accordance with the present invention by contact with a water insoluble tertiary amine. In accordance with the invention, contact with the amine causes a reaction between the molybdate component of the aqueous stream and the amine and enables an effective phase separation to be carried out whereby the amine/molybdate product is readily separated from an aqueous phase which is greatly reduced in molybdenum. In an especially preferred practice of the invention, the water insoluble amine is admixed with an organic solvent such as ethyl benzene prior to contact with the aqueous phase in order to facilitate separation of an organic amine/molybdenum containing phase from the remaining aqueous stream.

The treated aqueous phase greatly reduced in molybdenum, can then be forwarded for various conventional treatments for the ultimate removal of deleterious materials. The organic amine/molybdate phase passes to one or more separate zones where it is treated with basic material such as aqueous alkali, e.g. sodium hydroxide, ammonium hydroxide, etc. which serves to regenerate the tertiary amine and to convert the contained molybdenum material to water soluble molybdate. The organic phase containing the tertiary amine can be recycled for further molybdenum extraction while the molybdenum-containing aqueous stream can be treated by conventional procedures for recovery of molybdenum values.

The water insoluble tertiary amine which is employed in practice of the invention has the formula $N(R)_3$ where each R is the same or a different $C_1$–$C_{20}$ alkyl group, preferably a higher $C_5$–$C_{12}$ alkyl group, and most preferably the R's are a mixture of $C_8$ and $C_{10}$ hydrocarbon groups. In especially preferred practice, the ratio of $C_8$ to $C_{10}$ groups is 2:1. ALAMINE 336 is an especially suitable insoluble tertiary amine for use. ALAMINE 336 is a registered trademark of Henkel Corporation.

Through practice of the present invention, the amount of molybdenum remaining in the aqueous acidified process stream can be reduced from an original content of 1000 ppm or more to as low as about 20 ppm or lower enabling the treated aqueous stream to be conveniently further processed.

It is believed that the process of the invention proceeds by the following sequence:

$2(R_3N) + 2H^+ \rightarrow 2(R_3NH)^+$
$2(R_3NH)^+ + MoO_4^{2+} \rightarrow (R_3NH)_2MoO_4$
$(R_3NH)_2MoO_4 + 2NaOH \rightarrow 2(R_3N) + Na_2MoO_4 + H_2O$ Suitable acids for use include sulfuric acid, hydrochloric acid, phosphoric acid, formic acid, and the like. In place of sodium hydroxide, other strong bases such as ammonium hydroxide, potassium hydroxide and the like can be used. Amounts of acid and base to achieve the appropriate pH's as described below are employed.

Referring to the drawing, an aqueous residue stream containing sodium and molybdenum values obtained from the caustic treatment of process streams in an conventional propylene oxide/styrene monomer process passes via line 1 to acidification zone 2. In zone 2, the residue stream is acidified to a low pH, e.g. below about 3 and preferably 2 or lower, by admixture with aqueous acid such as aqueous sulfuric acid or hydrochloric acid which is introduced via line 3. The resultant mixture is phase separated and the acidified organic phase is removed via line 4. Conventionally, this organic phase can be further treated as described, for example, in U.S. Pat. Nos. 5,276,235 and 5,210,354.

From zone 2, an aqueous phase containing most, if not substantially all, of the sodium and molybdenum values passes via line 5 to molybdenum extraction zone 6 wherein the aqueous phase is contacted with the water insoluble tertiary amine, the latter being introduced into zone 6 via line 7. In especially advantageous practice, the amine is dissolved in an organic solvent which is water immiscible. Most advantageously, the organic solvent is indigenous to the process, e.g. ethylbenzene in the case of a propylene oxide/styrene monomer process stream treatment although, of course, other comparable solvents can be used such as benzene, cyclohexane, and the like.

In zone 6, the tertiary amine is protonated by the acid, e.g. sulfuric acid or hydrochloric acid used to acidify the aqueous caustic stream forming an ammonium cation in the organic phase. Additional strong acid can be added to the mixture in zone 6 as needed to maintain the low pH, e.g. about 2 (not shown). The molybdate in the aqueous stream from zone 2 reacts with the ammonium cation as above indicated, effectively removing molybdate from the aqueous phase. Upon phase separation, an organic phase comprised of the protonated amine and the great predominance of the molybdenum values is separated via line 8 and the aqueous stream greatly reduced in molybdenum is separated via line 9. This aqueous stream which may contain as little as 20 ppm or less of molybdenum can be further treated by known procedures.

The organic molybdate-containing stream is then regenerated by contact with a base. Although this can be carried out in a single treatment step, preferably a two step regeneration is employed as shown in the drawing, especially in the usual case where phenolic compounds are present in the aqueous molybdenum phase from zone 2 and are carried into zone 13 via line 8.

Removal of molybdenum from the protonated tertiary amine can successfully be accomplished at a pH of 8 or higher. However, phenolic materials present in the aqueous phase from zone 2 require a higher pH, e.g. 11 or higher, for effective removal from the tertiary amine. If the phenolic materials are not removed, the tertiary amine undergoes a deactivation or loss in the ability to remove molybdenum.

In preferred practice as shown in the drawing, the organic molybdate-containing stream passes via line 8 to regeneration zone 13 wherein it is contacted with an aqueous ammonium hydroxide stream, which is introduced via line 14, at a pH of about 8-9. In zone 13, the molybdate is converted to ammonium molybdate. The amine phenate with associated organic solvent passes from zone 13 via line 15 to zone 10 wherein it is contacted with aqueous sodium hydroxide, introduced via line 11, at a pH of 11-12 and the reaction mixture is phase separated. As a result, the tertiary amine is regenerated and passes along with the ethyl benzene via line 7 to zone 6 for reuse.

An organic rich aqueous stream containing the phenolic values is separated via line 12.

The aqueous sodium molybdate stream passes from zone 13 via line 16 for molybdenum recovery or disposal treatment in accordance with conventional procedures.

In the various treatment steps normal temperatures and pressures can be employed. Temperatures of 10°-40° C. are suitable although higher or lower temperatures can be used. Pressures from about atmospheric to 100 psig are useful although higher pressures can be used.

EXAMPLE 1

A molybdenum and sodium containing waste water stream from a propylene oxide styrene monomer process was treated in accordance with the present invention. The stream had been water-stripped, acidified with sulfuric acid to a pH of about 2 and extracted with an organic solvent to remove organic materials.

The waste water stream which was treated contained 780 ppm by weight molybdenum. The waste water stream was contacted with an equal weight of an ethyl benzene stream containing 5 wt % ALAMINE 336 tertiary amine ($R_3N$) where each R is a $C_8$ or $C_{10}$ alkyl group, the ratio of $C_8$ to $C_{10}$ groups being 2:1. Contact temperature was about 17° C. and contact time was about 10 minutes.

The resulting admixture was phase separated into an aqueous phase reduced in molybdenum and an organic phase which was separated and contacted with a 1 wt % aqueous sodium hydroxide solution, the weight ratio being 3 part organic stream to 1 part aqueous sodium hydroxide stream, for about 10 minutes at about 17° C. The resulting mixture was phase separated with the aqueous sodium molybdate stream recovered and the organic ethyl benzene solution containing the tertiary amine being returned for treatment of additional acidified waste water stream; this was repeated for 4 cycles of treatment.

After the first contact treatment, 99.1% of the molybdenum was removed from the aqueous waste stream heaving a residual molybdenum content of 7 ppm. The ethyl benzene and tertiary amine stream contained 730 ppm molybdenum. After contact with the aqueous sodium hydroxide stream the recycle ethyl benzene and tertiary amine stream contained less than 5 ppm molybdenum and the aqueous extract stream contained 0.20 wt % molybdenum representing 99.3% removal of molybdenum.

The second cycle resulted in 98.9% molybdenum removal from the aqueous waste stream leaving a residual molybdenum content of 9 ppm. The ethyl benzene and amine stream contained 740 ppm molybdenum. After contact with the aqueous sodium hydroxide stream the recycle ethyl benzene and tertiary amine stream contained less than 5 ppm molybdenum and the aqueous extract stream contained 0.20 wt % molybdenum representing 99.4% removal of molybdenum.

The third cycle resulted in 98.7% molybdenum removal from the aqueous waste stream leaving a residual molybdenum content of 10 ppm. The ethyl benzene and amine stream continued 730 ppm molybdenum after contact with the aqueous sodium hydroxide stream the recycle ethyl benzene and tertiary amine stream contained less than 5 ppm molybdenum and the aqueous extract stream contained 0.20 wt % molybdenum representing 99.4% removal of molybdenum.

The fourth cycle resulting in 98.4% molybdenum removal from the aqueous waste stream leaving a residual molybdenum content 13 ppm. The ethyl benzene and tertiary amine stream contained 0.073 wt % molybdenum. After contact with the aqueous sodium hydroxide stream the recycle ethyl benzene and tertiary amine stream contained less than 5 ppm molybdenum and the aqueous extract stream contained 0.20 wt % molybdenum representing 99.4% removal of molybdenum.

In an extended study using procedures analogous to the above after 22 cycles the tertiary amine effectively removed more than 98% of the molybdenum, reducing the molybdenum content of the treated aqueous stream to less than 20 ppm.

EXAMPLE 2

A molybdenum and sodium containing aqueous residue stream from a propylene oxide/styrene monomer process was treated in accordance with the invention as described in the accompanying drawing.

The stream had been water-stripped, acidified in zone 2 with hydrochloric acid to a pH of about 2 and extracted with an organic solvent to remove organic materials.

The aqueous stream containing about 1100 ppm molybdenum was passed via line 5 to zone 6 wherein it was contacted with an equal weight of an ethyl benzene stream containing 5 wt % ALAMINE 336 tertiary an ($R_3N$) where each R is a $C_8$ or $C_{10}$ alkyl group, the ratio of $C_8$ to $C_{10}$ groups being 2:1; which was introduced via line 7. Contact temperature was about 17° C. and contact time was about 10 minutes. After the 10 minute contact time, hydrochloric acid was added as needed to maintain the pH at about 2; the admixture was mixed for about 10 minutes.

The resulting admixture was phase separated into an aqueous phase reduced in molybdenum and an organic phase which was separated via line 8 and contacted in zone 13 with either 5 or 10 wt % aqueous ammonium hydroxide solution, to reach a pH r about 9. Contact temperature was about 17° C, and contact time was about 10 minutes. The resulting mixture was phase separated with the aqueous ammonium molybdate stream recovered via line 16 and the organic ethyl benzene solution containing tertiary amine from which more than 99% of the molybdenum had been removed passed via line 15 to zone 10 wherein it is contacted at 17° C. for 10 minutes with 15 wt % aqueous sodium hydroxide introduced via line 11 to reach a pH of about 11.

The reaction mixture was phase separated with an aqueous sodium phenate stream removed via line 12 and a regenerated tertiary amine and ethyl benzene stream removed via line 7 and recycled to zone 6 and the cycle repeated.

Even after 19 cycles, more than 97% of the molybdenum was removed in zone 6 at each cycle reducing the molybdenum content of the treated aqueous residue stream to less than 30 ppm.

I claim:

1. The method of recovering molybdenum from a reaction mixture containing molybdenum and phenolic impurities resulting from a molybdenum catalyzed epoxidation of an olefin with an organic hydroperoxide which comprises adding aqueous caustic to the reaction mixture, separating an aqueous phase containing molybdenum, sodium and phenolic impurities, adding acid to the separated aqueous phase to acidify the separated aqueous phase, extracting molybdenum from the acidified aqueous phase by contacting with a water insoluble tertiary amine, contacting the molybdenum containing tertiary amine with aqueous base at pH of 8-9 to provide a molybdenum containing aqueous phase, separating tertiary amine containing phenolic impurities from the molybdenum containing aqueous phase, contacting the tertiary amine containing phenolic impurities with aqueous base at a pH of at least 11 to remove the phenolic impurities, and then separating the tertiary amine.

2. The process of claim 1 wherein said molybdenum containing tertiary amine is contacted with aqueous ammonium hydroxide.

3. The process of claim 1 wherein said tertiary amine containing phenolic impurities is contacted with aqueous sodium hydroxide.

4. The method of claim 1 wherein the tertiary amine has the formula $N(R_3)$ where each R is a $C_1$–$C_{20}$ alkyl group.

5. The method of claim 1 wherein the tertiary amine has the formula $N(R_3)$ where each R is a $C_5$–$C_{12}$ alkyl group.

6. The method of claim 1 wherein the tertiary amine has the formula $N(R_3)$ where each R is a $C_8$–$C_{10}$ alkyl group.

* * * * *